United States Patent [19]
Renard et al.

[11] Patent Number: 6,066,791
[45] Date of Patent: May 23, 2000

[54] SYSTEM FOR INSTRUCTING THE PLAYING OF A MUSICAL INSTRUMENT

[75] Inventors: Paul S. Renard, Flossmoor; Robert R. Graham, Jr., Chicago, both of Ill.

[73] Assignee: Renarco, Inc., Chicago, Ill.

[21] Appl. No.: 09/237,733

[22] Filed: Jan. 26, 1999

Related U.S. Application Data

[60] Provisional application No. 60/072,891, Jan. 28, 1998.

[51] Int. Cl.⁷ .................................................. G09B 15/02
[52] U.S. Cl. .......................... 84/477 R; 84/600; 84/609; 84/649; 84/470 R; 84/485 R
[58] Field of Search ............................. 84/600, 609–612, 84/649–652, 470 R, 477 R, 478, 483.1, 483.2, 485 R, DIG. 6

[56] References Cited

U.S. PATENT DOCUMENTS

| | | |
|---|---|---|
| 4,307,645 | 12/1981 | Rauchi . |
| 4,364,299 | 12/1982 | Nakada et al. . |
| 4,366,741 | 1/1983 | Titus .......................................... 84/478 |
| 4,416,182 | 11/1983 | Wise et al. . |
| 4,730,533 | 3/1988 | Schoerkmayr . |
| 5,183,398 | 2/1993 | Monte et al. . |
| 5,214,231 | 5/1993 | Ernst et al. . |
| 5,252,772 | 10/1993 | Wright . |
| 5,266,735 | 11/1993 | Shaffer et al. . |
| 5,392,682 | 2/1995 | McCartney-Hoy .................... 84/470 R |
| 5,394,784 | 3/1995 | Pierce et al. ........................... 84/464 A |
| 5,491,297 | 2/1996 | Johnson et al. . |
| 5,495,786 | 3/1996 | Choi . |
| 5,540,132 | 7/1996 | Hale . |
| 5,544,562 | 8/1996 | Jeon . |
| 5,585,583 | 12/1996 | Owen . |

OTHER PUBLICATIONS

Valerie Moses, No Practicing—Piano Music Reading for the Busy Person, Mar. 27, 1980 Paul Renard, A Music Dynamics Programmers' Guide, 1975, p. 3—Outline of Organ Playing.

*Primary Examiner*—Robert E. Nappi
*Assistant Examiner*—Marlon T. Fletcher
*Attorney, Agent, or Firm*—Trexler, Bushnell, Giangiorgi & Blackstone, Ltd.

[57] ABSTRACT

The present invention discloses a novel method and apparatus for instructing a student how to play a musical instrument. The method includes providing a display device, displaying a staff on the display device, displaying an image on the display device, and instructing the student to focus on the image while preferably using a musical instrument to play the notes on the staff, wherein the image moves generally in the direction of the progression of notes on the staff while the student attempts to play the, notes with the musical instrument. As the image moves, the image preferably moves in a direction generally parallel to the staff.

53 Claims, 9 Drawing Sheets

SYSTEM FOR INSTRUCTING THE PLAYING OF A MUSICAL INSTRUMENT

CROSS-REFERENCE

This application claims the benefit of U.S. Provisional Application No. 60/072,891, filed Jan. 28, 1998.

BACKGROUND OF THE INVENTION

This invention generally relates to systems for instructing one how to play a musical instrument. The invention more specifically relates to a novel system of instructing one how to play a musical instrument by using a computer.

In general, for many, many years, instructors have used the same method for educating students how to play musical instruments. For example, to teach the student how to read the music on the page, the instructor has the student think of each individual note on the lines of the staves and between the lines of the staves in terms of mnemonics. For example, for the treble staff, the instructor has the student think in terms of "F A C E" and "Every Good Boy Does Fine" where the musical notes "F," "A," "C" and "E" are the notes between the lines of the staff and the musical notes "E," "G," "B," "D" and "F" are the notes on the lines of the staff. In much the same manner, for the bass staff, the instructor has the student think in terms of "All Cows Eat Grass" and "Good Boys Do Fine Always" where the musical notes "A," "C," "E" and "G" are the notes between the lines of the staff and the musical notes "G," "B," "D," "F" and "A" are the notes on the lines of the staff. The method generally involves having the student play the same songs over and over again while is listening to the "ticktock" sounds of a metronome in order to learn timing and counting.

Most students find the above-described, conventional method of learning how to play a musical instrument time-consuming, frustrating, difficult to learn and not very much fun. This is true especially of children who are often "forced" by their parent(s) to take musical instrument instruction or "music lessons." As a result of the particular method being used to teach the children how to play a musical instrument, these children often "give up" after not really learning how to play the musical instrument very well. Later, these children, after they have become adults, typically are not willing again to try to learn how to play a musical instrument. Frankly, this is because these adults do not generally want to relive an experience they feel has tortured them during their childhood.

Adults who have not taken "music lessons" as children typically do not, as adults, have the time or the inclination to sit through countless music lessons where each lesson or session is time-consuming, frustrating, difficult and not very much fan to experience.

The above-described conventional teaching, method essentially forces the student to focus more on determining what notes should be played rather than focusing on actually playing the piece of music. As a result, the student does not really contribute much attention to actually listening to the music that she or he is playing with the musical instrument. However, arguably, this is the most enjoyable part of playing a musical instrument.

Presently, there is software commercially available for teaching one how to play a musical instrument. The software is used with a computer connected to a musical instrument, such as a piano keyboard. Unfortunately, the software generally available at the present time uses the same ineffective teaching method described hereinabove, and essentially merely amounts to "a gloss being put on old horse-and-buggy thinking." While the computer may work to keep a student's interest slightly longer due to the "gloss" such as computer animation, the same old ineffective teaching method is essentially being used by the software.

It is apparent that a new method and apparatus for instructing one how to play a musical instrument is needed, and the present invention provides as such. By the present invention, learning to play a musical instrument can be both easier and more enjoyable than ever before.

OBJECTS AND SUMMARY OF THE INVENTION

A general object of the present invention is to provide a method and apparatus for instructing a student how to play a musical instrument where learning is more enjoyable for the student.

A further object of the present invention is to provide a method and apparatus for teaching a student a more effective way to read music.

Another object of the present invention is to provide a method and apparatus for teaching a student how to sight-read musical notes.

Still another object of the present inventor is to provide a method and apparatus for instructing a student how to play a musical instrument where the student is left to concentrate more on listening to what she or he is playing rather than on what individual musical note should be played at a particular time.

Briefly, and in accordance with the foregoing, the present invention discloses a novel method and apparatus for instructing a student how to sigh-tread music. The apparatus provides program code which is readable by a computer, where the program causes the computer to direct a display device to display a staff and an image generally adjacent the staff, and to display the image moving in a direction which is generally parallel to the staff, generally along a progression of notes on the staff. The method includes steps of providing a display device, displaying a staff on the display device, displaying an image on the display device, and instructing a student to focus on the image while moving the image in a direction which is generally parallel to the staff, generally along a progression of notes on the staff.

The above-described apparatus and method can be used to teach a student to read music by having the student focus on a specific point in relation to the staff—i.e. on the moving image—rather than actively looking at each individual note.

Preferably, two staves are displayed on the display device, the bass staff and the treble staff, and the staves "wrap around" the screen, thus appearing as two sets of two staves, one over the other. Preferably, the moving image is initially displayed between the two staves of the top set of staves, at a position approximately equivalent to middle C, and "wraps around" the screen at the appropriate time to continue between the two staves of the lower set of staves, again at a position approximately equivalent to middle C. As a result, the student is trained to read the music by focusing on middle C, between two staves of music.

Preferably, the student is instructed to initially focus on the moving image without playing a musical instrument for a period of time so that the student can become efficient at focusing on the moving image without having his eyes stray to the musical notes above and/or below the moving image on the staves. Subsequently, the student is instructed to attempt to play the musical piece while focusing on the moving image.

Preferably, a video insert portion is provided on the display device showing the instructor, and a personal one-on-one music lesson taught by a human instructor is simulated.

Preferably, the computer is connected to the display device, to an audio device and to a musical instrument, and the computer monitors the student's playing of the musical notes. Should the student fail to play the correct musical note at a given time, preferably the computer preferably instantly provides the student with guidance using the audio device. At this time, a video insert may also instantly "pop up" and display a human instructor talking, where that which is emitted by the audio device is in synchronization with what is displayed in the video insert. The audio device and possibly also the video insert may, at times, instruct the student how to play the musical instrument while the student is not actually playing. Again, the software is directed to simulate personal interaction with a human instructor.

Preferably, if the computer detects that the student has made a mistake playing the musical instrument the computer uses the audio device and possibly also the video insert to instruct the student. Preferably, the student is directed to attempt to play the musical piece starting from the beginning. On the other hand, if the student plays the entire musical piece correctly, preferably the computer provides that the student may go on to the next musical piece. which may be more advanced.

It is preferred that, at times, as the student plays the first number of notes of a musical piece, the computer determines the student's timing and adjusts accordingly by adjusting the speed at which the image moves from note to note. In this manner, the student sets the overall timing by his or her own play of the musical instrument, and the computer teaches the student to have consistent timing throughout the playing of the musical piece.

Alternatively, the speed at which the image moves from note to note may be preset. Regardless, preferably the computer monitors the musical instrument and determines whether each keystroke is made within an acceptable time period, typically provided as a range.

Preferably, the display device is used to teach the student interval patterns of musical notes before the student is instructed to attempt to play a musical piece. Specifically, a flash card method can be used to teach the student several interval patterns, and then the display device can be used to quiz the student on the different interval patterns. Preferably, the display device is also used to have the student do some "touchwork" where the student is directed to attempt to play an interval pattern as the interval pattern is displayed on the display device. Preferably, the computer uses the audio device to instruct the student with regard to the interval patterns. The display device may display a video insert, the interval pattern, and a keyboard image showing the finger placement which should be employed to play the interval pattern. In this case, the video insert preferably displays a human instructor and the computer uses the audio device to output the words spoken by the human instructor. "Stop and go lights" or some other visible indicator may be used to inform the student when he or she should begin to attempt to play the interval pattern. This ensures that the computer is ready to receive input from the musical instrument at the time the student attempts to play the interval pattern.

Preferably, the computer uses the audio device to teach the student interval patterns, and test him with regard to the interval patterns. A video insert may also be displayed on the display device, wherein a human instructor "pops up" immediately upon a mistake being made by the student. Hence, the student has immediate feedback and live, personal instruction by a human instructor is simulated.

With regard to the interface between the computer and the musical instrument, preferably a Multimedia Authoring Environment, such as Macromedia Director®, and an external C++ program are used to create MIDI.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DESCRIPTION OF AN EMBODIMENT OF THE INVENTION

Figure 1:
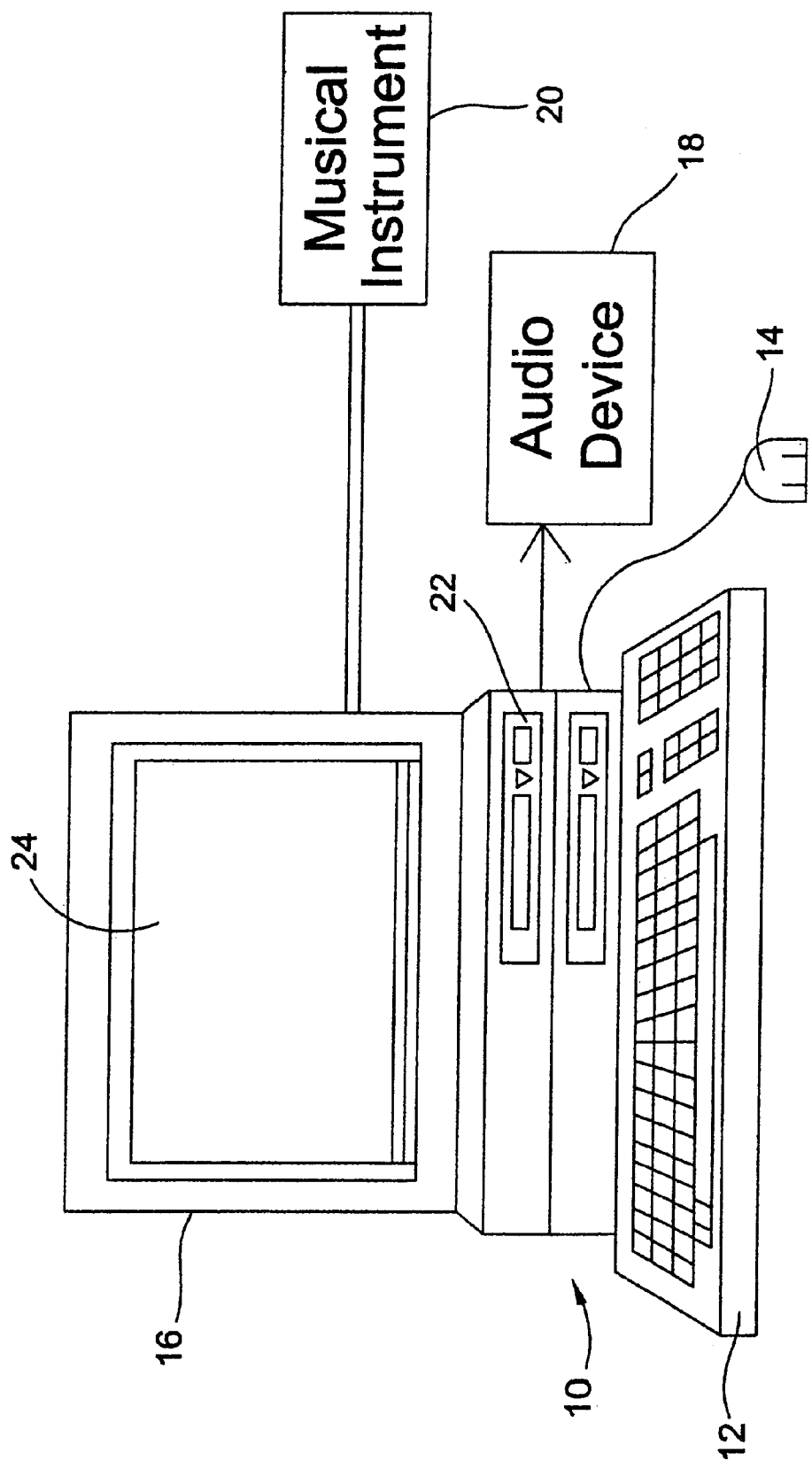
FIG. 1 is a schematic view depicting a computer connected to, among other items, a display device and a musical instrument.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

FIG. 1 illustrates a computer 10 including a keyboard 12, a mouse 14 and several other devices connected to the computer 10. Specifically, FIG. 1 depicts a display device 16, such as a computer monitor, connected to the computer 10, as well as an audio device 18 and a musical instrument 20 connected to the computer 10. The audio device 18 may be a sound card which is installed in the computer 10 and speakers connected to the sound card. The musical instrument 20 is preferably a Musical Instrument Digital Interface (MIDI)-capable musical instrument such as a MIDI keyboard. The connection between the computer 10 and the musical instrument 20 provides that the computer 10 can monitor what is input through the musical instrument 20, and therefore monitor a student as the student plays the musical instrument 20.

The present invention provides software, i.e. code which is readable by the computer 10, for instructing one how to sight-read music and play the musical instrument 20. Preferably, the software is embodied on a data storage medium such as on a CD-ROM disc, and the CD-ROM disc can be inserted into a CD-ROM drive 22 of the computer 10 so the computer 10 may run the software embodied thereon. Of course, the software in accordance with the present invention may instead be provided on one or more floppy discs for reading by a floppy disc drive connected to the computer 10, or the software may be stored in the hard drive of the computer 10. Of course, other possibilities exist without going outside the scope of the present invention.

The software provides several screen shots or sequences of displays which the computer 10 directs the display device 16 to display and provides audio which the computer 10 directs the audio device 18 to output. Preferably, the screen shots and audio tracks have been authored using a Multimedia Authoring Environment, such as the presently commercially available program Macromedia Director®.

The software also includes computer code, "Xtra", which essentially provides an interface between the computer 10 and the musical instrument 20 connected thereto. In other words, the code provides that the computer 10 "understands" the musical instrument 20. This is important because the computer 10 preferably monitors the playing of the musical instrument 20 by the student, compares it with what he or she should be playing, and based on this comparison, takes appropriate instructional action. The "Xtra" computer code provided by the present invention may be written in C++, and is believed to be the first music-teaching program for the Macromedia Director® environment.

As mentioned, the software works to teach a student how to sight-read music and play the musical instrument 20 connected to the computer 10. To this end, the software provides that the computer 10 displays screen shots 26 on the screen 24 such as that which is shown FIGS. 2 to 9. Preferably, the is software provides that the computer 10 directs the audio device 18 to output audio to the student. The software may also provide that the computer 10 directs the display device 16 to, at times, display a video insert 28 containing a human instructor. Preferably, as shown in FIGS. 2 to 9, the software directs the display device 16 to display, at times, a video insert portion 28, a main display portion 30 and an option select portion 32. The option select portion 32 provides that the student may use the mouse 14, keyboard 12 or some other input device to select an option. For example, as shown in the FIGURES, the option select portion 32 may include sections for ordering the computer 10 to print music to a printer connected to the computer 10, for ordering the computer 10 to pause the program, for ordering the computer or software to show the student how to perform the task at hand, and for displaying other options which are available.

Figure 6:
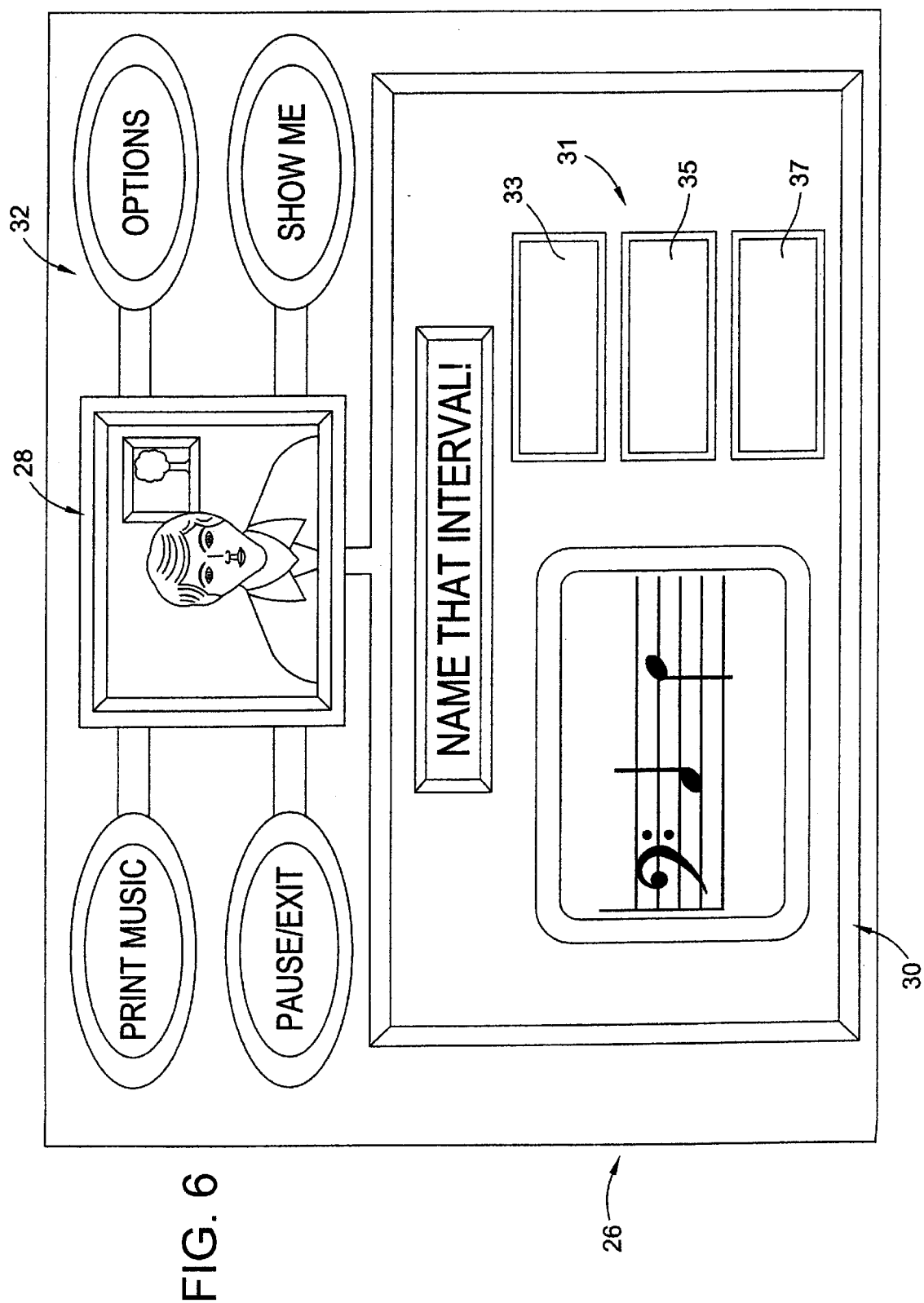
FIG. 6 is a view (screen shot), similar to that of FIG. 5, of the display of the display device, illustrating an interval pattern game which is used to test a student, showing a video insert which appears on the display device.
Figure 8:
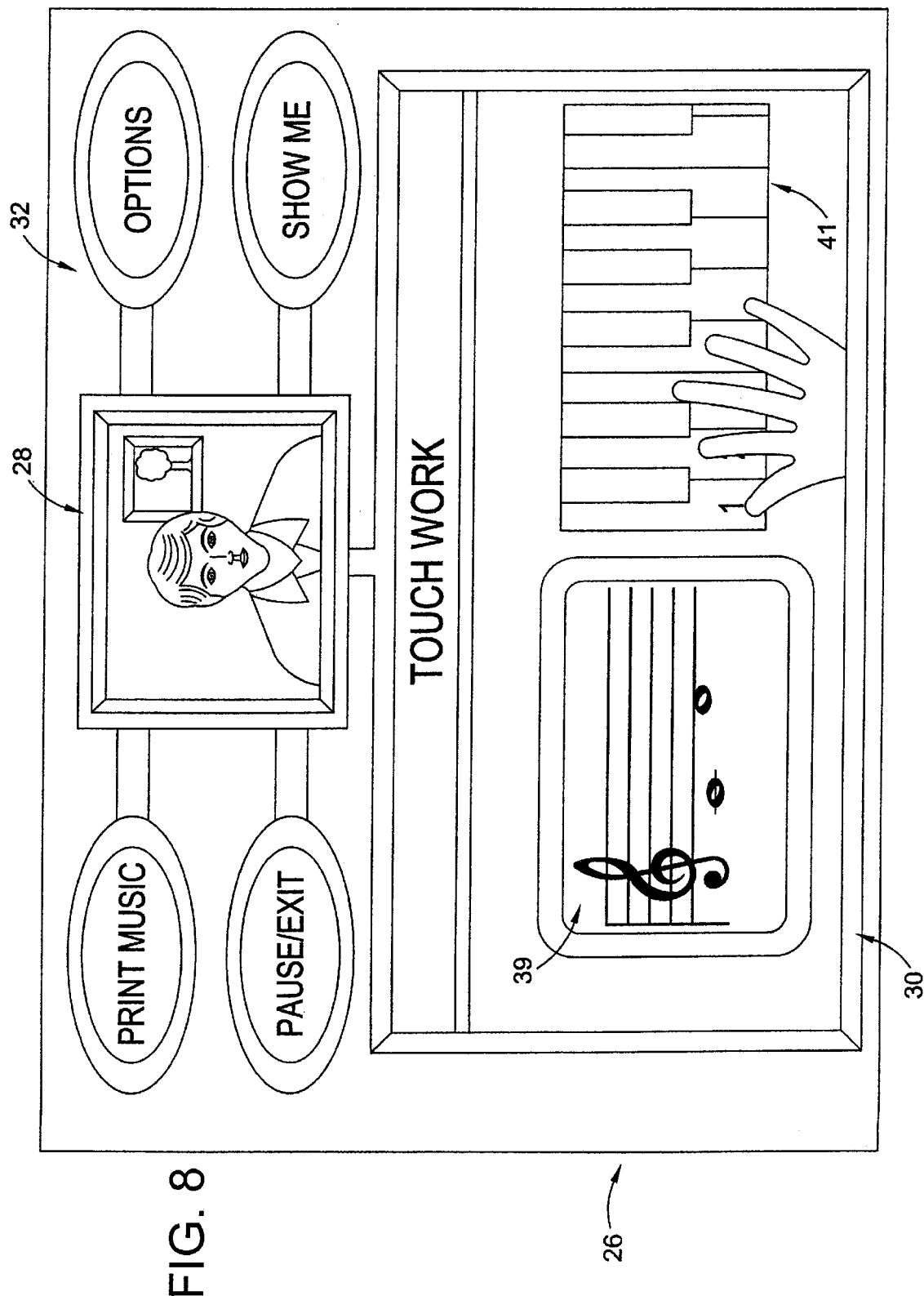
FIG. 8 is a view (screen shot), similar to that of FIG. 7, of the display of the display device, illustrating a three part display, showing a video insert which appears on the display device.

The video portion 28 preferably runs in synchronization with the audio device 18, and, at times, as shown in FIGS. 6 and 8, preferably displays the head of a person, such as the music industry renown Mr. Paul Renard, speaking to the student (essentially a "talking head"). As the person displayed in the video portion 28 speaks, the audio device 18 plays the words spoken. As a result, the software generally causes the computer 10 to simulate one-on-one interaction with a human instructor.

It is also anticipated that the software may cause the computer 10 to use the audio device 16 to output speech for the student to hear without necessarily directing the video device 16 to display a video insert 28. However, it is preferred that, at times, the software causes the computer 10 to display a human instructor in the video insert 28, where the human instructor is talking. At this time, preferably, the computer 10 directs the audio device 16 to output sounds corresponding to what the human instructor is apparently saying.

At times, the video portion 28 and audio device 18 provide long uninterrupted monologues (unless the student selects "pause" from the option select portion 32) instructing the student how to sight-read music and/or play the musical instrument 20. For example, how to count correctly or how to respond to musical notes which will be displayed during the lesson. At other times, the student is directed to focus on the main portion 30 of the display and attempt to play the musical piece shown therein. In other words, basically throughout the course, the software teaches the student by playing audio through the audio device 18 connected to the computer 10, and at times, directing the display device 16 to display a video insert 28 which includes an image of a human instructor talking with the words spoken being played through the audio device 18.

Preferably, the software initially causes the computer 10 to direct the display device 16 to display one or more start up screens, and then prompts the student to insert his name using the keyboard 12. This is because the software provides that the computer 10 keeps a database or history of how far along one or more users have progressed through the course. As a result, several different people may use the software, and the software keeps track of where each user is within the course. This is useful in some applications, such as in the case where a music instruction school is using the software to instruct its students.

After the student logs in his or her name, the software preferably causes the computer 10 to direct the display device 16 to display a progress report for that particular student. Essentially, this is a table of contents of the entire course, showing how far along that particular student has progressed. The progress report may include listings such as "finding your way," "music theory and pulse," "sight-reading," "picture," "rules of the road," "interval training," "touch work," "peripheral line training" and "reading and playing." Of course, other possibilities exist while remaining within the scope of the present invention.

Therefore, a new student begins the course at "finding your way," and this section of the course has the student determine which musical instrument 20, such as which type of keyboard (i.e. 61 key, 76 key, or 88 key), is connected to the computer 10. Then, the software teaches the student music basics, such as the notes on the keyboard, what the staff, staves and clefs are, what measures or bars are, what double bars and repeat marks are, the location of middle C, what the definitions of treble and bass are and what a brace is.

As the software teaches the student, the student is prompted by the audio device 18 or display device 16 to strike a key on the musical instrument 20 and/or to strike a key on the keyboard 12 and/or to provide an input using the mouse 14 (or some other type of input). Once the computer 10 receives this input, the software proceeds to the next step in the course, sometimes by changing the display of the display device 16, and sometimes by proceeding to the next section listed in the progress report as described above.

The "music theory and pulse" section of the course preferably teaches the student more music basics, such as what ledger lines are, the different notes of the two staves, what sharps, flats and naturals are, what the chromatic scale is, what the diatonic scales are, what time signatures are, what the different note values are, what dotted notes are, what rests are, what piano and pianissimo are, what forte and fortissimo are, what crescendo and decrescendo are, what key signatures are and what legato and staccato are.

The "sight-reading" section of the course preferably teaches the student sight-reading basics, such as what intervals are, generally how to read them and what the difference is between reading individual notes and reading intervals.

The "picture" section of the course has the student view different eye pictures, or interval patterns, displayed on the display device 16.

The "rules of the road" section of the course teaches the student further sight-reading concepts.

The "interval training" section of the course is like a flash card session, and teaches the student different interval patterns by having the student view several different interval patterns which are sequentially displayed on the display device 16.

Figure 2:
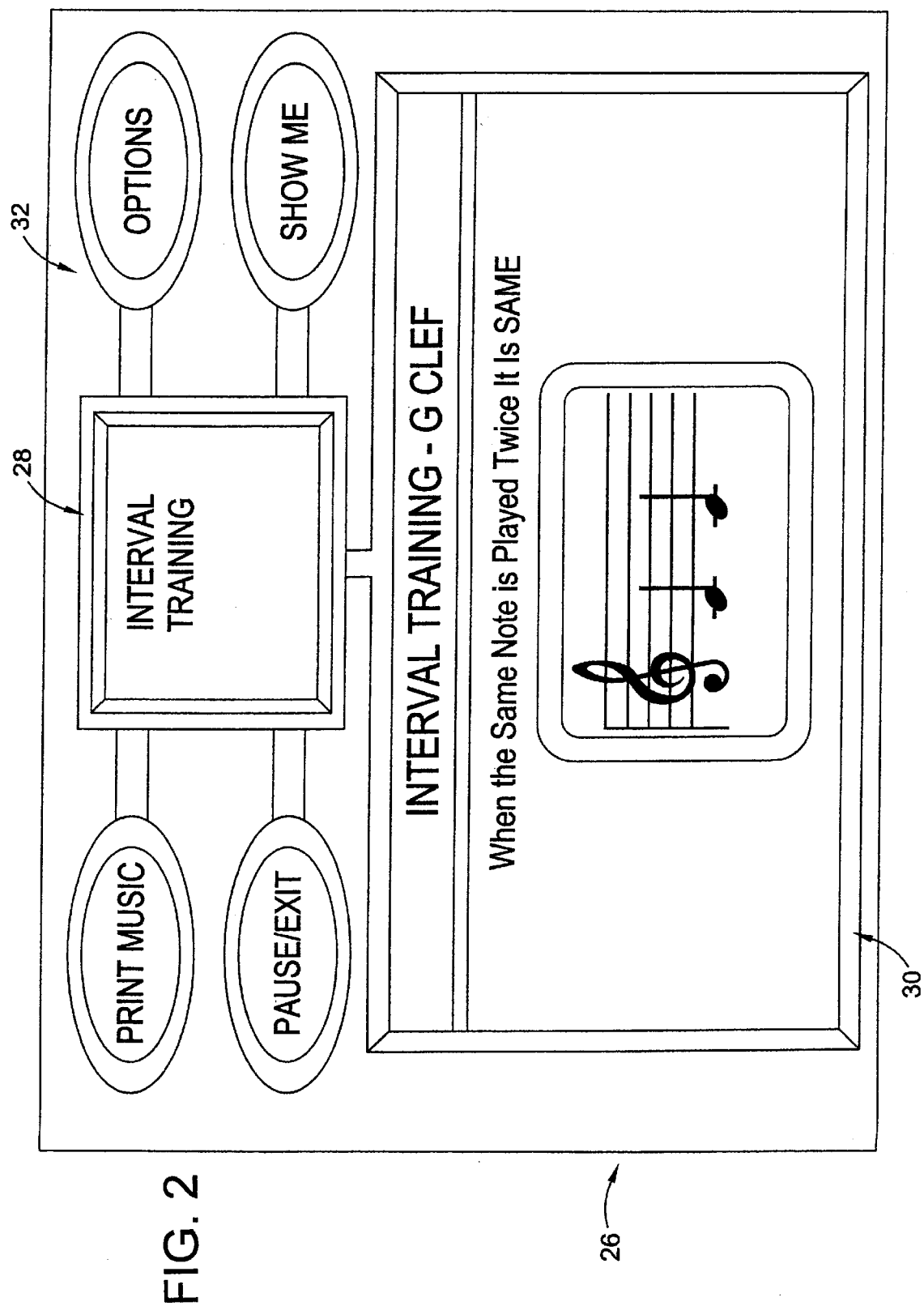
FIG. 2 is a view (screen shot) of the display device of FIG. 1, illustrating a specific interval pattern being displayed.
Figure 3:
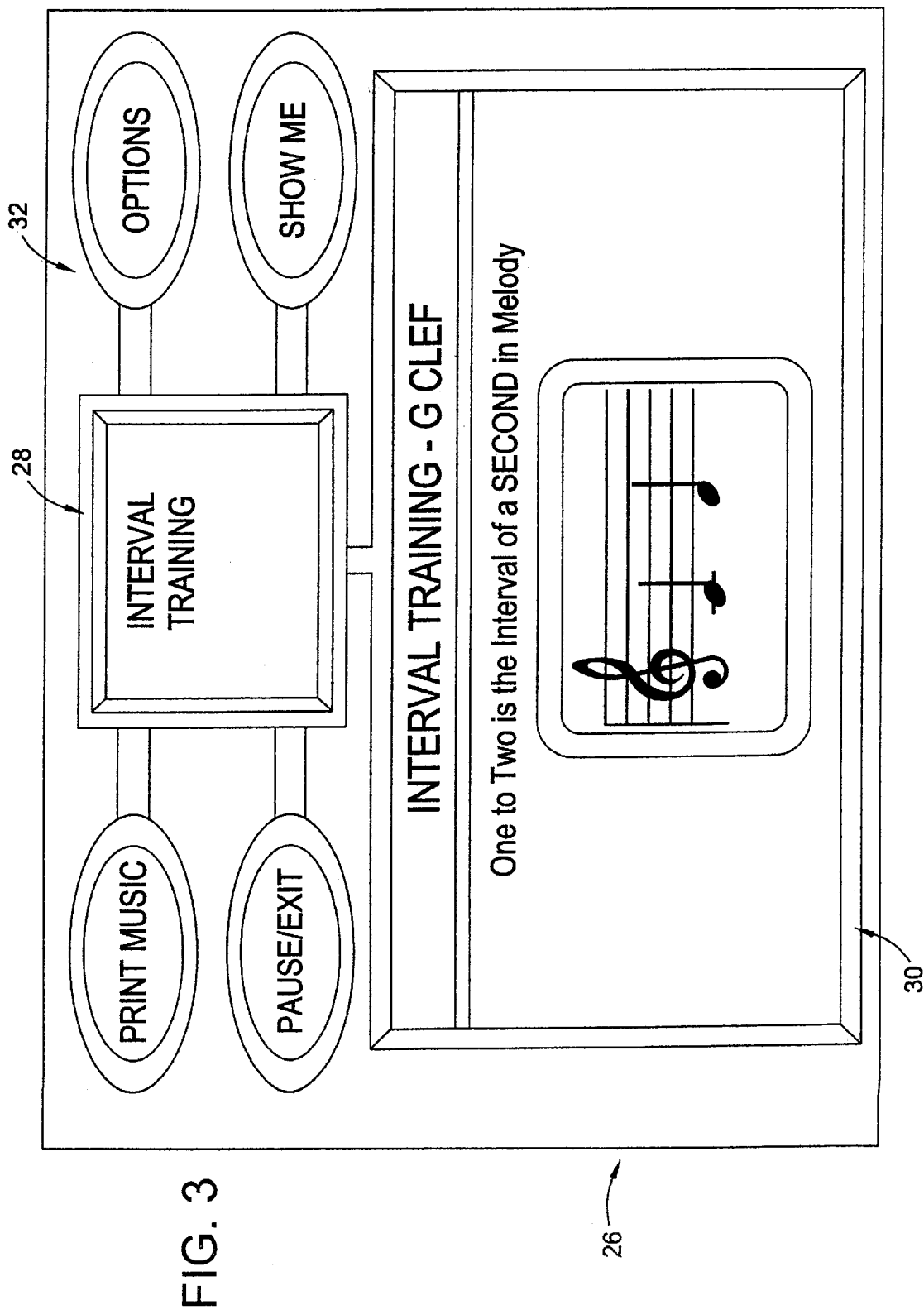
FIG. 3 is a view (screen shot), similar to that of FIG. 2, of the display device, illustrating another interval pattern being displayed.
Figure 4:
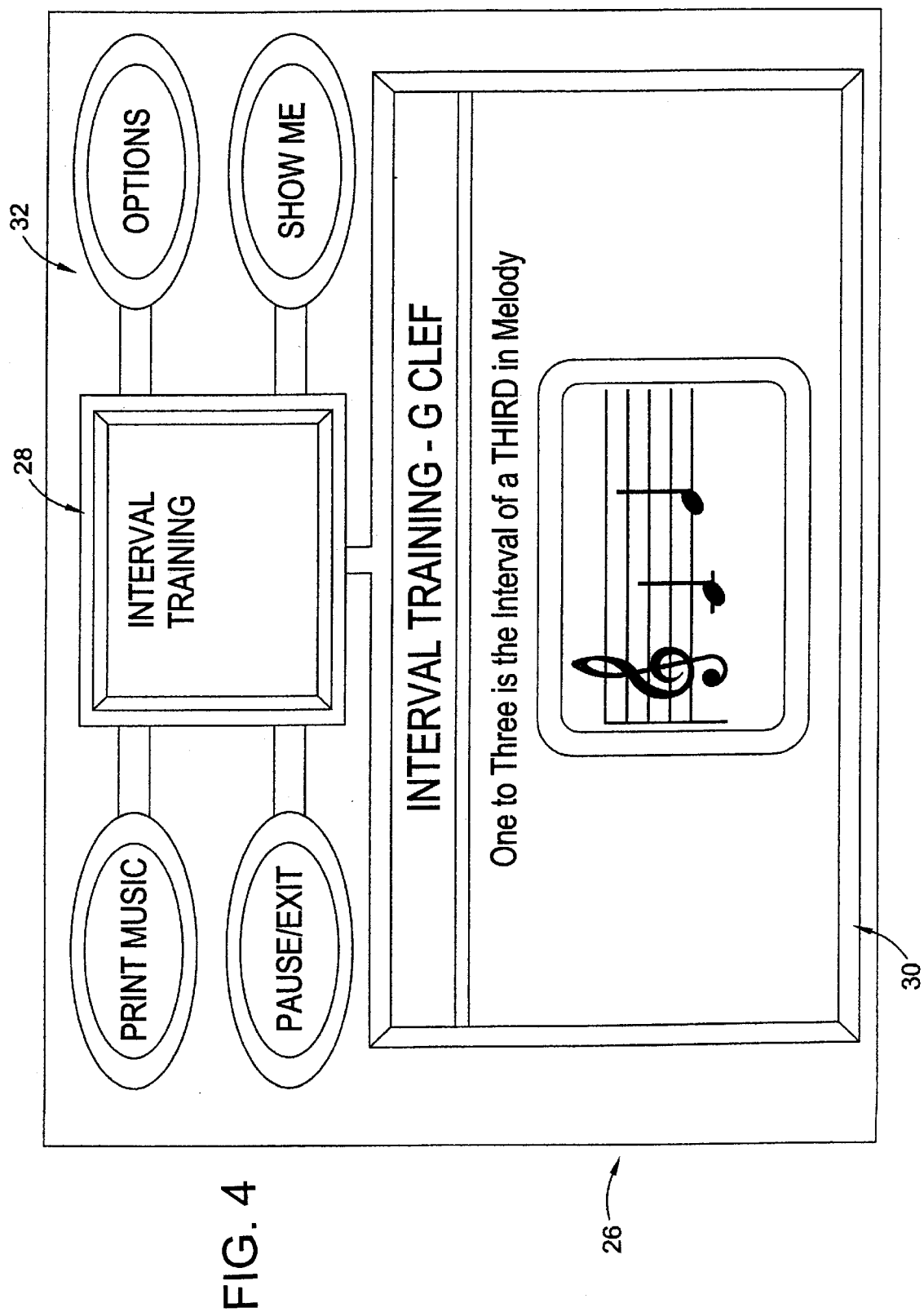
FIG. 4 is a view (screen shot), similar to that of FIGS. 2 and 3, of the display device, illustrating still another interval pattern being displayed.

For example, FIG. 2 depicts the situation where the display device 16 displays an interval pattern called "same." After the student views this interval pattern, the student may strike a key on the musical instrument 20 which causes the display device 16 to display another interval pattern, such as that which is depicted in FIG. 3—an interval pattern called "second." After the student views this interval pattern, the student may strike a key on the musical instrument 20 which causes the display device 16 to display yet another interval pattern, such as that which is depicted in FIG. 4—an interval pattern called "third." This is just one example of a progression of screen shots 26 which is possible, and several other possibilities exist. Additionally, preferably more interval patterns are preferably displayed on the display device 16 than are depicted in FIGS. 2 through 4, as FIGS. 2 through 4 are meant merely to provide an example.

Subsequently, preferably within the "interval training" section of the course, the software causes the computer 10 to quiz the student to determine if he of she has learned the different interval patterns which have been previously shown to him on the display device 16.

Figure 5:
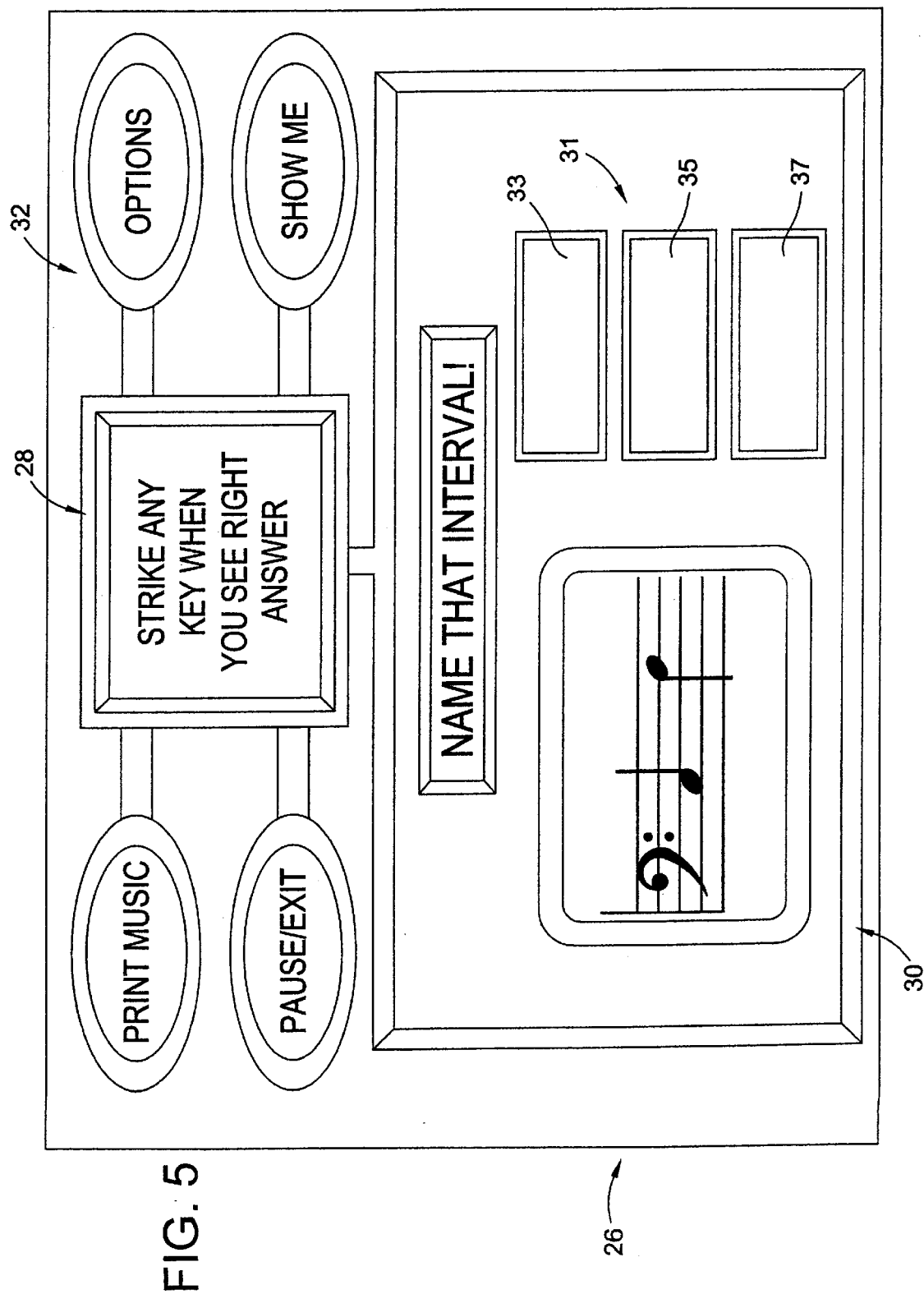
FIG. 5 is a view (screen shot) of the display of the display device, illustrating an interval pattern game which is used to test a student.

This quiz section of the course may be called "name that interval" and is shown in FIG. 5. As shown in FIG. 5, preferably a specific interval pattern is displayed, and then different answers (i.e. names of interval patterns) are displayed in an answer section 31 of the display. Specifically, the computer 10 may monitor input received from the musical instrument 20, the keyboard 12 and/or the mouse 14 as different interval pattern names are displayed in the answer section 31. For example, the student may be prompted to press a key on his musical instrument 20 (or provide some other type of input) when he sees the correct answer displayed in the answer section 31. Then, a first possible answer may appear in a first box 33 of the answer section 31, and if no input is received from the student within a certain period of time, a second possible answer may be displayed in a second box 35 of the answer section 31. and if still no input is received from the student after a certain amount of time, a third possible answer may be displayed in a third box 37 of the answer section 31. If the student selects the incorrect answer (i.e. selects the incorrect interval name), preferably, as shown in FIG. 6, the video portion 28 displays the human instructor, and the human instructor (along with synchronous output from the audio device 18) effectively informs the student that he has selected the wrong answer, and informs the student as to what the correct answer is. In this manner, the software simulates personal one-on-one instruction from a human instructor. Preferably, the interval pattern quiz is repeated for several different interval patterns until it is determined that the student is competent at identifying the different interval patterns.

Of course, other means of testing or quizzing the student may be used. For example, three different answers may be displayed simultaneously in the boxes 33, 35 and 37, and the student may be prompted to provide an input (e.g. by hitting a specific key on the musical instrument 20 or keyboard 12) which corresponds to the answer he selects.

Figure 7:
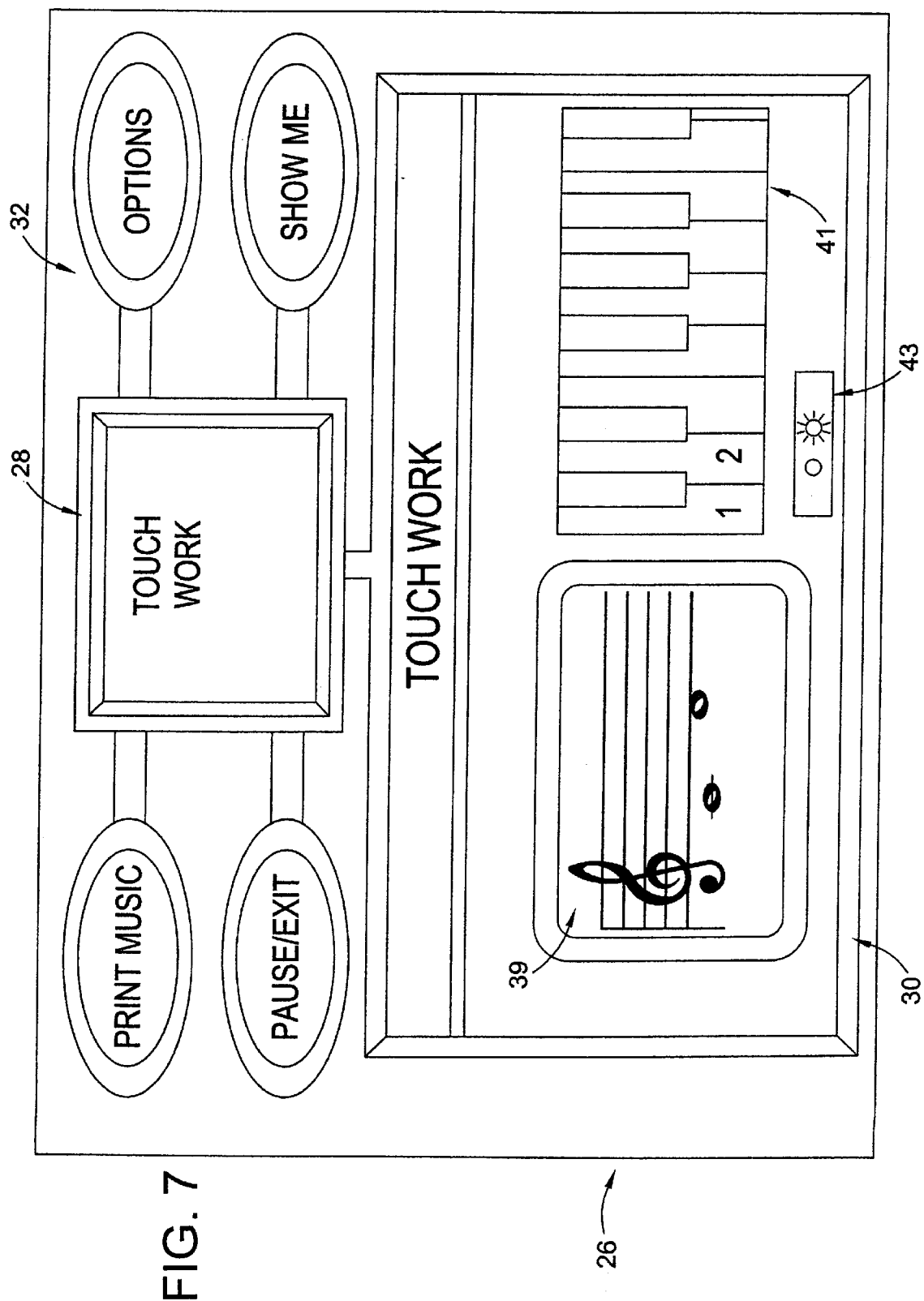
FIG. 7 is a view (screen shot) of the display of the display device, illustrating a three part display at which time the student is directed to attempt to play an interval pattern which is displayed.

Subsequently, the "touch work" section of the course provides that the student is directed to attempt to play, using, the musical instrument 20, different interval patterns as they are displayed on the display device 16. As the student attempts to play the interval pattern being, displayed, the computer 10 monitors the musical instrument 20 to determine if the student is playing, the interval pattern correctly and plays the keys struck on the musical instrument 20 through is the audio device 18. A display such as that which is shown in FIG. 7 may be employed, wherein a video insert 28 of a human instructor, an interval pattern 39, and an image 41 representing at least a portion of the musical instrument 20 are simultaneously displayed. Alternatively, the software may not cause the computer 10 to direct the display device 16 to display the video insert 28, and may instead merely use the audio device 18 to instruct the student. As shown, the image 41 representing at least a portion of the musical instrument 20 may include a representation of finger placement which should be employed in association with the musical instrument 20 to play the interval pattern correctly.

After a specific interval pattern is displayed such as is shown in FIG. 7, the computer 10 preferably monitors the musical instrument 20 to determine if the interval pattern is played correctly. To ensure that the computer 10 is ready the receive input from the musical instrument 20, a computer ready indicator 43, such as a stop and go light, may be displayed which informs the student when he or she can attempt to play the interval pattern which is being displayed. When the student attempts to play the interval pattern, preferably any musical notes played by the student using the musical instrument 20 are played through the audio device 18 connected to the computer 10.

If the interval pattern is not played correctly, preferably the human instructor appears in the video portion 28 of the display to inform (using synchronous audio output from the audio device 18) the student as such. Preferably, this process is repeated for several different interval patterns, and this section of the course is fairly extensive.

By recognizing interval patterns of several musical notes, the student need not think of each note as a separate note standing alone. In much the same manner that people do not generally think of words as individual letters when one is speaking, having the student think of the notes in terms of interval patterns will cause the student to read musical notes much more efficiently, thereby allowing the student to concentrate more on hearing the music he or she is playing rather than on the individual notes he or she is reading.

Preferably, the software builds instantaneous reaction to music through screens that train the student to react to musical notes by striking notes on the musical instrument 20, much like a driving simulator teaches reaction to traffic situations.

By learning to recognize musical notes in terms of interval patterns and by learning to see adjacent notes by focusing on a specific point, one essentially learns how to sight-read music which provides that one can essentially read the music subconsciously while freeing up more conscious mind listening to the music that is being played.

Figure 9:
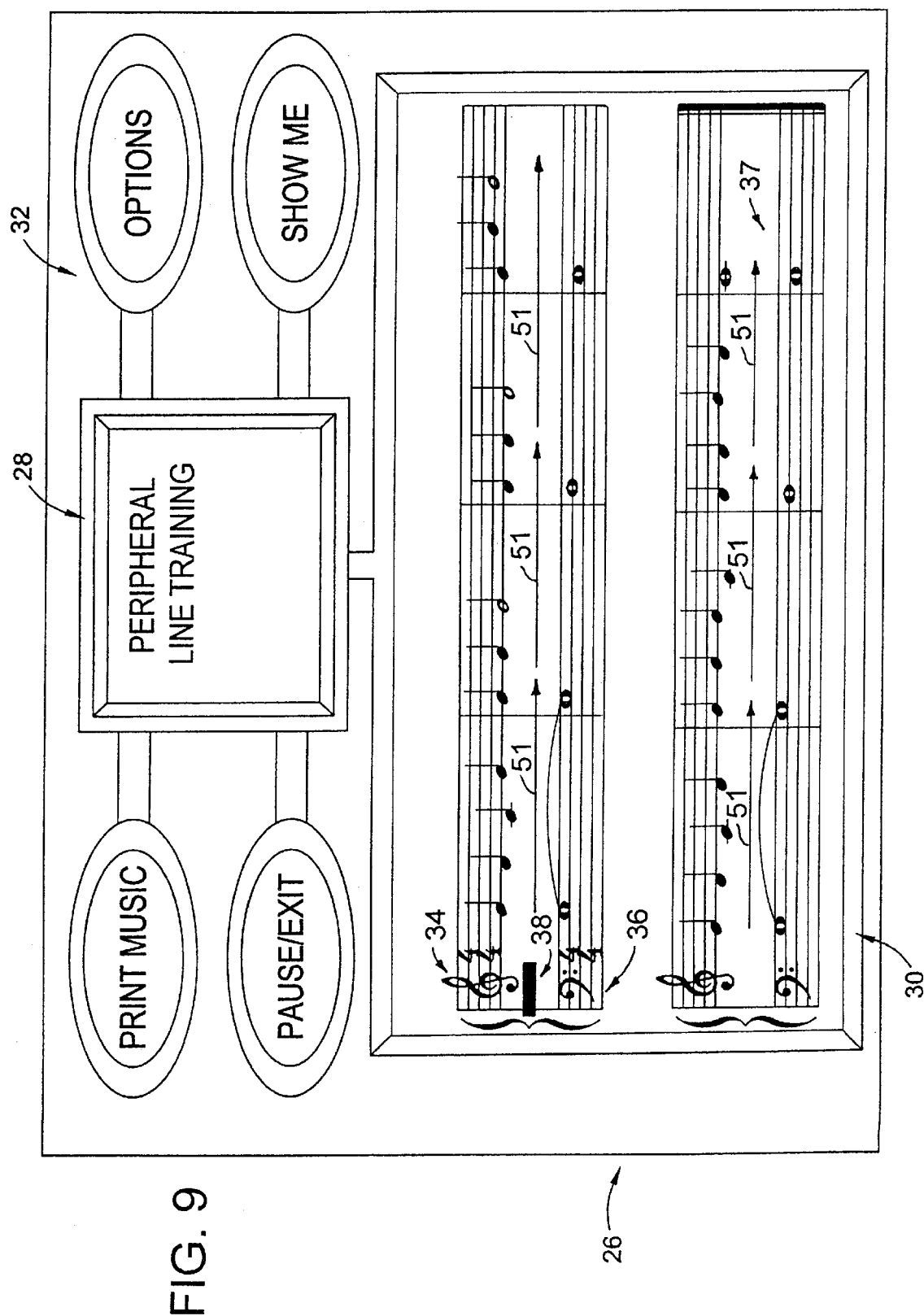
FIG. 9 is a view (screen shot) of the display on the display device, illustrating, using a series of arrows, an image moving between a set of two staves.

In the "peripheral line training" section of the course, as shown in FIG. 9, preferably a musical piece or a portion thereof is displayed on the display device 16, and the musical portion includes a bass staff 34 and a treble staff 36 which "wrap around" the screen or display. In other words, while it appears in FIG. 9 that there are two separate sets of two staves displayed, what is being displayed is actually one set of two staves where the bottom two staves are merely a continuation of the top two staves. As the notes progress to the last notes of the screen (identified by reference numeral 37), either the musical piece is done, or the screen will change to show the rest of the musical piece. Of course, more than two sets of staves may be displayed on the screen such that a whole page of musical score is displayed on a single screen.

As shown in FIG. 9, an image or what cm be called an "anchor" 38 is displayed on the screen 24, between the top two staves, between the bass staff 34 and the treble staff 36, approximately at middle C, near the first notes of the musical piece. At this point in the course, the student is directed (e.g. by the video portion 28 and/or the audio device 18) to focus on the anchor 38 while the anchor 38 moves across the screen 24. As the anchor 38 moves, the audio device 18 may count out the beat in the following manner: "One and," "One and two and," etc. This method of counting can be called "pulse" and is more effective than merely saying "One. . . Two. . ." By hearing "One and," "One and two and," etc. while attempting to play the piece, the student becomes better at internally counting, and after a while, can do so subconsciously.

Importantly, the anchor 38 concept will now be described in detail. The anchor 38 is an image displayed on the screen 24 to teach the student to focus on a constant point while trying to read the nearby musical notes with his or her peripheral (up-to-down) view. By focusing on the anchor 38, the student can see both the bass notes and the treble notes without moving his or her eyes in either the direction of the bass staff 34 or the treble staff 36. As a result, one may read the notes faster and with more accuracy over time without moving one's eyes up or down, but only across, along the staves 34 and 36 of music.

As represented in FIG. 9 by arrows 51, the anchor 38 moves from note to note, but remains substantially at middle (C. In other words, the anchor 38 moves along the staves but does not really move in relation to either staff. The anchor 38 remains essentially generally parallel with each staff as it moves along the piece causing the student to focus on middle C and read adjacent musical notes using his or her peripheral (up-to-down) vision.

The anchor 38 "wraps around" the screen it the appropriate time. Additionally, if the entire musical piece is not displayed on the screen 24, the screen may "renew" and display the next portion of the music piece at which time the anchor 38 will move to the first note of the new screen.

Preferably, the student is initially instructed, during the "peripheral line training portion" of the course, to focus on the anchor 38 without trying to play the musical piece on the musical instrument 20, and may be instructed to do so for as long as one-half hour before attempting to play a musical piece. In this manner, the student may become efficient at focusing on the anchor 38 without having his eyes move up or down, and this may be learned quickly without being distracted by attempting to play the musical instrument 20.

Subsequently, in the "reading and playing" portion of the course, the student is directed to attempt to play the musical piece which is being displayed. At this time, the screen may also appear as shown in FIG. 9, but with the "Peripheral Line Training" heading being replaced with a "Reading and Playing" heading. As the student attempts to play the musical piece being displayed, the anchor 38 moves along the piece, as described hereinabove, and the computer 10 monitors the musical instrument 20 to determine whether the student is playing the musical piece correctly. If not, the software may provide that the audio device 18 outputs some verbal direction and/or the human instructor may appear in the video portion 28. If the student plays correctly, the software may provide that the audio device 18 outputs some verbal direction and/or the human instructor may appear in the video insert 28 and the next lesson will appear. Again, this simulates one-on-one instruction from a human instructor. As the student plays the musical instrument 20, preferably the notes which are played are emitted through the audio device 18 connected to the computer 10.

Preferably, the software provides that upon the student making a mistake, the human instructor immediately pops up to inform the student of the error, and to provide guidance. In this manner, one-on-one instruction is simulated. When the instructor pops up, preferably the computer 10 uses the audio device 16 to emit the words apparently spoken by the human instructor. Alternatively, the computer may, at times, merely use the audio device 16 to instruct the student and may not employ the video insert 28.

Preferably, during the "reading and playing" portion of the course, the software provides that the student is able to attempt playing several different musical pieces which range in difficulty. In this manner, the student can progress to more difficult musical pieces as he or she becomes more advanced.

It is preferred that, at times, as the student plays the first number of notes of a musical piece using the musical instrument 20, the computer 10 determines the student's timing and adjusts accordingly by adjusting the speed at which the anchor 38 moves from note to note and possibly the rate at which audible counting is performed through the audio device 18. In this manner, the student sets the overall timing by his or her own play of the musical instrument 20 and the computer 10 teaches the student to have consistent timing throughout the playing of the musical piece. Alternatively, the speed at which the image moves from note to note may be preset.

Regardless, preferably the software provides that the computer 10 monitors the playing of the musical instrument 20 to determine whether each keystroke is played at the correct time, where the "correct time" is preferably provided as a range which is generally centered at the correct time at which the keystroke was supposed to have been made, and provides some leeway as a result of the range.

While the student is playing the musical piece displayed, the computer 10 monitors the student's playing and audibly sounds the notes struck by the student through the audio device 18. When a mistake is detected, such as in the timing of the playing of the notes, or that the incorrect note has been played, the video portion 28 of the display may provide guidance to the student in the form of monologue (using the audio device 18) from the instructor shown in the video. Of course, this monologue may be implemented during the playing of the piece, such as by urging the student to correct his or her timing or counting, or may be implemented after the student has attempted to play the piece. If the student plays correctly, the software may provide that the audio device 18 outputs some verbal direction at which time the human instructor may also appear in the video insert 28, and the next lesson will appear.

Thus, it is an important aspect of the present invention to provide an image or "anchor" 38 on the screen 24 of the computer display device 16. As mentioned, the anchor 38 teaches the student how to read musical notes with his or her peripheral vision, and this increases the speed and efficiency at which the student can read the notes. Another important aspect of the present invention is the providing of instruction, using the computer 10 and audio device 18 (and possibly also the human instructor iii the video insert 28), of how to count in terms of "One and," "One and two and," etc. This method of counting greatly improves one's timing while attempting to play musical notes. Still another important aspect of the present invention is the providing of instruction, using the computer 10 and audio device 18 and/or display device 16, of how to recognize interval patterns of music notes rather than attempting to read notes individually.

As a result of the foregoing, the present invention provides that a computer 10 can teach a student how to effectively and effortlessly (over time) sight-read musical notes and play a musical instrument well. The present invention provides that a computer 10 can instruct a student how to play a musical instrument where the learning is more enjoyable for the student than ever before. As can be seen by reviewing the above, preferably the software provides a course which is fairly comprehensive such that anyone can use it—from a beginner to a professional.

While a preferred embodiment of the present invention is shown and described, it is envisioned that those skilled in the art may devise various modifications thereto without departing from the spirit and scope of the present invention.

What is claimed is:

1. Computer readable program code comprising code configured to cause a computer to direct a display device to display a treble staff and a bass staff, wherein at least one of the treble staff and bass staff has musical notes thereon, and an image between the treble staff and bass staff, and configured to cause the computer to direct the display device to display the image moving between the treble staff and bass staff in a direction which is generally parallel to the bass staff and treble staff, generally along a progression of the musical notes.

2. Computer readable program code as recited in claim 1, wherein the code is configured to cause the computer to direct the display device to display the image, at a position approximately equivalent to middle C.

3. Computer readable program code as recited in claim 1, wherein the treble staff and bass staff wrap around the display thereby appearing as a plurality of sets of staves on the display device.

4. Computer readable program code as recited in claim 1, wherein the code is configured to cause the computer to direct the display device to flier display a video insert of a human instructor.

5. Computer readable program code as recited in claim 4, wherein the code is configured to cause the computer to emit sounds through an audio device connected to the computer, wherein the sounds are a voice of the human instructor and the voice is synchronized with movement of a mouth of the human instructor displayed in the video insert.

6. Computer readable program code as recited in claim 1, wherein the code is configured to cause the computer to emit sounds through an audio device connected to the computer, wherein the sounds are a voice of a human instructor.

7. Computer readable program code as recited in claim 1, wherein the code is configured to cause the computer to monitor a musical instrument connected thereto.

8. Computer readable program code as recited in claim 7, wherein the code is configured to cause the computer to play musical notes played on the musical instrument through an audio device connected to the computer.

9. Computer readable program code as recited in claim 7, wherein the code is configured to cause the computer to direct the display device to display a video insert of a human instructor, depending on what the computer receives from the musical instrument connected thereto.

10. Computer readable program code as recited in claim 9, wherein the code is configured to cause the computer to emit sounds through an audio device connected to the computer, wherein the sounds are a voice of the human instructor and the voice is synchronized with movement of a mouth of the human instructor displayed in the video insert.

11. Computer readable program code as recited in claim 7, wherein the code is configured to cause the computer to emit sounds through an audio device connected to the computer, wherein the sounds are a voice of a human instructor.

12. Computer readable program code as r(cited in claim 7, wherein the code is configured to cause the computer to determine a student's timing as the student plays the musical instrument connected to the computer and then adjust a speed at which the image moves along the progression of musical notes displayed on the display device depending on the student's timing.

13. Computer readable program code as recited in claim 1, wherein the code is configured to cause the computer to direct the display device to sequentially display different interval patterns of musical notes in order to teach the student the different interval patterns.

14. Computer readable program code as recited in claim 1, wherein the code is configured to cause the computer to direct the display device to display an interval pattern while monitoring a musical instrument connected to the computer to determine if the interval pattern is played correctly on the musical instrument.

15. Computer readable program code as recited in claim 14, wherein the code is configured to cause the computer to play musical notes played on the musical instrument through an audio device connected to the computer.

16. Computer readable program code as recited in claim 14, wherein the code is configured to cause the computer to direct the display device to simultaneously display a video insert of a human instructor, the interval pattern, and an image representing at least a portion of the musical instrument connected to the computer.

17. Computer readable program code as recited in claim 14, wherein the code is configured to cause the computer to emit sounds through an audio device connected to the computer, wherein the sounds are a voice of a human instructor.

18. Computer readable program code as recited in claim 17, wherein the code is configured to cause the computer to play musical notes played on the musical instrument through the audio device connected to the computer.

19. Computer readable program code comprising code configured to cause a computer to direct a display device to display different interval patterns of musical notes in order to teach the student the different interval patterns, wherein the code is configured to cause the computer to direct the display device to display the interval pattern while monitoring a musical instrument connected to the computer to determine if the interval pattern is played correctly on the musical instrument, wherein the code is configured to cause a computer to direct a display device to display a video insert of a human instructor, depending on what the computer receives from the musical instrument connected thereto, wherein the code is configured to cause the computer to emit sounds through an audio device connected to the computer, wherein the sounds are a voice of the human instructor and the voice is synchronized with movement of a mouth of the human instructor displayed in the video insert.

20. A method for instructing a student how to sight-read music, said method comprising: providing a display device; displaying a treble staff and a bass staff on the display device, wherein at least one of the treble staff and bass staff has musical notes thereon; displaying an image on the display device between the treble staff and the bass staff; instructing the student to focus on the image while attempting to read the musical notes; and moving the image between the treble staff and bass staff in a direction which is generally parallel to the treble staff and bass staff, generally along a progression of notes.

21. A method as recited in claim 20, further comprising displaying the image, at a position approximately equivalent to middle C.

22. A method as recited in claim 20, further comprising displaying on the display device a video insert of a human instructor.

23. A method as recited in claim 22, further comprising emitting sounds through an audio device connected to the computer, wherein the sounds are a voice of the human instructor and the voice is synchronized with movement of a mouth of the human instructor displayed in the video insert.

24. A method as recited in claim 20, further comprising emitting sounds through an audio device connected to the computer, wherein the sounds are a voice of a human instructor.

25. A method as recited in claim 20, further comprising providing a computer connected to the display device, and having the computer monitor the musical instrument connected thereto.

26. A method as recited in claim 25, further comprising causing the computer to play musical notes played on the musical instrument through an audio device connected to the computer.

27. A method as recited in claim 25, further comprising having the computer monitor the musical instrument connected thereto and determine a student's timing as the student plays the musical instrument, and adjusting a speed at which the image moves along the progression of musical notes displayed on the display device depending on the student's timing.

28. A method as recited in claim 20, further comprising sequentially displaying different interval patterns of musical notes on the display device.

29. A method as recited in claim 20, further comprising having a computer monitor a musical instrument connected thereto; displaying an interval pattern on the display device and having the computer monitor the musical instrument connected to the computer to determine if the interval pattern is played correctly; and simultaneously displaying, on the display device, a video insert of a human instructor, the interval pattern, and an image representing at least a portion of the musical instrument connected to the computer.

30. A method as recited in claim 29, further comprising causing the computer to emit sounds through an audio device connected to the computer, wherein the sounds are a voice of the human instructor and the voice is synchronized with movement of a mouth of the human instructor displayed in the video insert.

31. A method as recited in claim 20, further comprising having a computer monitor a musical instrument connected thereto; displaying an interval pattern on the display device and having the computer monitor the musical instrument connected to the computer to determine if the interval pattern is played correctly; simultaneously displaying the interval pattern, and an image representing at least a portion of the musical instrument connected to the computer; and causing the computer to output audio using an audio device connected thereto.

32. Computer readable program code comprising code configured to cause a computer to display musical notes on a display device connected to the computer and to detect notes played on a musical instrument connected to the computer wherein the code is configured to cause the computer to direct the display device to display a video insert of a human instructor and emit a voice of the human instructor through in audio device connected to the computer, generally upon the computer detecting that the musical notes displayed on the display device have been played incorrectly on the musical instrument wherein the code causes the computer to simulate one-on-one musical instruction from the human instructor by displaying the human instructor on the display device and emitting the voice of the human instructor through the audio device.

33. Computer readable program code comprising code configured to cause a computer to display musical notes on a display device connected to the computer and to detect notes played on a musical instrument connected to the computer wherein the code is configured to cause the computer to direct an audio device connected to the computer to emit a voice of a human instructor, generally upon the computer detecting that the musical notes displayed on the display device have been played incorrectly on the musical instrument wherein the code causes the computer to simulate one-on-one musical instruction from the human instructor by displaying the human instructor on the display device and emitting the voice of the human instructor through the audio device.

34. Computer readable program code comprising code configured to cause a computer to direct a display device to display a staff having musical notes thereon and an image generally adjacent the staff, and configured to cause the computer to direct the display device to display the image moving in a direction which is generally parallel to the staff, generally along a progression of the musical notes on the staff, wherein the code is configured to cause the computer to direct the display device to further display a video insert of a human instructor, wherein the code is configured to cause the computer to emit sounds through an audio device connected to the computer, wherein the sounds are a voice of the human instructor and the voice is synchronized with movement of a mouth of the human instructor displayed in the video insert.

35. Computer readable program code as recited in claim 34, wherein the code is configured to cause the computer to direct the display device to display the image between two staves, at a position approximately equivalent to middle C.

36. Computer readable program code as recited in claim 34, wherein the code is configured to cause the computer to direct the display devise to display two staves, wherein the staves represent a bass staff and a treble staff, and wherein the staves wrap around the display thereby appearing as a plurality of sets of staves on the display device.

37. Computer readable program code as recited in claim 34, wherein the code is configured to cause the computer to monitor a musical instrument connected thereto.

38. Computer readable program code as recited in claim 37, wherein the code is configured to cause the computer to play musical notes played on the musical instrument through the audio device.

39. Computer readable program code as recited in claim 37, wherein the code is configured to cause the computer to direct the display device to display the video insert depending on what the computer receives from the musical instrument connected thereto.

40. Computer readable program code as recited in claim 37, wherein the code is configured to cause the computer to determine a student's timing as the student plays the musical instrument connected to the computer and then adjust a speed at which the image moves along the progression of musical notes displayed on the display device depending on the student's timing.

41. Computer readable program code as recited in claim 34, wherein the code is configured to cause the computer to direct the display device to sequentially display different interval patterns of musical notes in order to teach the student the different interval patterns.

42. Computer readable program code as recited in claim 34, wherein the code is configured to cause the computer to direct the display device to display an interval pattern while monitoring a musical instrument connected to the computer to determine if the interval pattern is played correctly on the musical instrument.

43. Computer readable program code as recited in claim 42, wherein the code is configured to cause the computer to play musical notes played on the musical instrument through the audio device connected to the computer.

44. Computer readable program code as recited in claim 42, wherein the code is configured to cause the computer to direct the display device to simultaneously display the video insert, the interval pattern, and an image representing at least a portion of the musical instrument connected to the computer.

45. Computer readable program code comprising code configured to cause a computer to direct a display device to display a staff having musical notes thereon and an image generally adjacent the staff, and configured to cause the computer to direct the display device to display the image moving in a direction which is generally parallel to the staff, generally along a progression of the musical notes on the staff, wherein the code is configured to cause the computer to monitor a musical instrument connected thereto, wherein the code is configured to cause the computer to direct the display device to display a video insert of a human instructor, depending on what the computer receives from the musical instrument connected thereto, wherein the code is configured to cause the computer to emit sounds through an audio device connected to the computer, wherein the sounds are a voice of the human instructor and the voice is synchronized with movement of a mouth of the human instructor displayed in the video insert.

46. A method for instructing a student how to sight-read music, said method comprising: providing a display device; displaying a staff on the display device; displaying an image on the display device; instructing the student to focus on the image while moving the image in a direction which is generally parallel to the staff, generally along a progression of notes on the staff; displaying on the display device a video insert of a human instructor and emitting sounds through an audio device connected to the computer, wherein the sounds are a voice of the human instructor and the voice is synchronized with movement of a mouth of the human instructor displayed in the video insert.

47. A method as recited in claim 46, further comprising displaying the image between two staves, at a position approximately equivalent to middle C.

48. A method as recited in claim 46, further comprising having the computer monitor the musical instrument connected thereto.

49. A method as recited in claim 48, further comprising causing the computer to play musical notes played on the musical instrument through the audio device connected to the computer.

50. A method as recited in claim 48, further comprising having the computer determine a student's timing as the student plays the musical instrument, and adjusting a speed at which the image moves along the progression of musical notes displayed on the display device depending on the student's timing.

51. A method as recited in claim 46, further comprising sequentially displaying different interval patterns of musical notes on the display device.

52. A method as recited in claim 46, further comprising having a computer monitor a musical instrument connected thereto; displaying an interval pattern on the display device and having the computer monitor the musical instrument connected to the computer to determine if the interval pattern is played correctly; and simultaneously displaying, on the display device, the video insert, the interval pattern, and an image representing at least a portion of the musical instrument connected to the computer.

53. A method for instructing a student how to sight-read music, said method comprising: providing a display device; displaying a staff on the display device; displaying an image on the display device; instructing the student to focus on the image while moving the image in a direction which is generally parallel to the staff, generally along a progression of notes on the staff; having a computer monitor a musical instrument connected thereto; displaying an interval pattern on the display device and having the computer monitor the musical instrument connected to the computer to determine if the interval pattern is played correctly; simultaneously displaying, on the display device, a video insert of a human instructor, the interval pattern, and an image representing at least a portion of the musical instrument connected to the computer; and causing the computer to emit sounds through an audio device connected to the computer, wherein the sounds are a voice of the human instructor and the voice is synchronized with movement of a mouth of the human instructor displayed in the video insert.

\* \* \* \* \*